June 5, 1923.                    L. CERRATO                    1,457,653

WHEEL BEARING

Filed Aug. 4, 1921

Inventor
Luis Cerrato,

By Emil Bümelyche

Attorney

Patented June 5, 1923.

1,457,653

UNITED STATES PATENT OFFICE.

LUIS CERRATO, OF FLORIDA, ARGENTINA.

WHEEL BEARING.

Application filed August 4, 1921. Serial No. 489,742.

*To all whom it may concern:*

Be it known that I, LUIS CERRATO, subject of the King of Italy, residing at 1420 O'Higgins Street, Florida, Republic of Argentina, have invented certain new and useful Improvements in Wheel Bearings, of which the following is a specification.

This invention relates to ball or roller bearing supports for motor-car wheels and the like, its principal object being to provide a special arrangement which will relieve some of the shearing stress from the flange bolts, and which is particularly suitable for such types of wheels as are used in the Ford, Chevrolet and other similar makes of cars.

According to the present invention, the whole weight of the car and its load is directly supported by the wheels by means of ball or roller bearing supports which are connected by bushings to the axle casing, so that the axle, in consequence, is free from carrying any weight and is used solely for the transmission of movement to the wheels.

Figure 1:
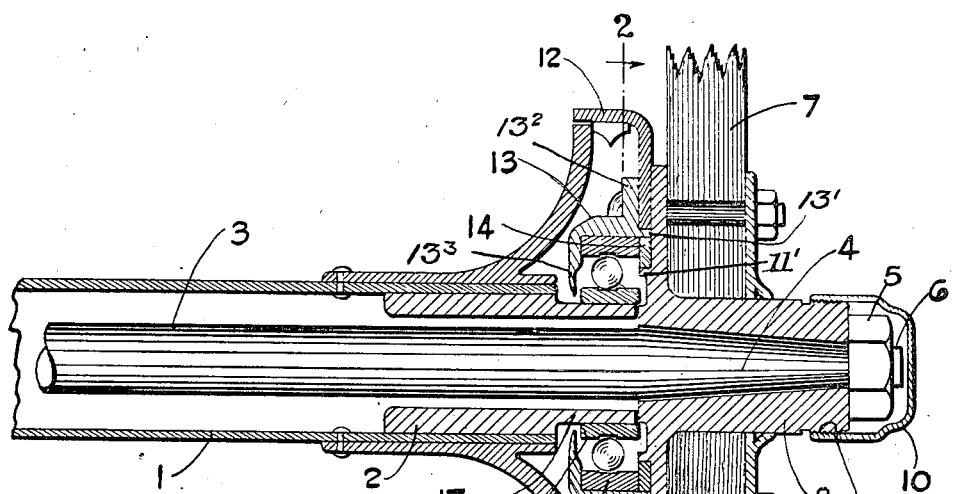
Figure 2:
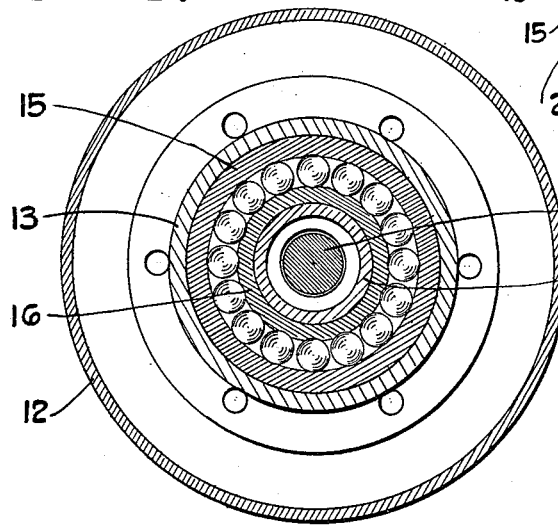
Figure 3:
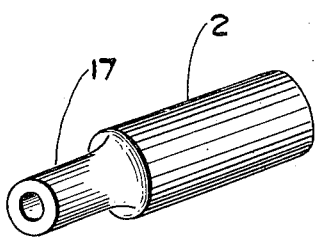

In order that the invention may be clearly understood and easily carried into practice I have shown a preferred embodiment of the same in the accompanying drawing, in which:

Figure 1 is a sectional view of the invention applied to the axle of a motor car; Fig. 2 is a section on line 2—2, Fig. 1; and Fig. 3 is a perspective view of the bushing.

1 is the axle casing, in the end of which an internal bushing 2 is suitably secured, said bushing being free of contact with the axle 3. As usual in such types of wheel supports, the projecting end of the axle 3 is tapered as at 4, and has a retaining nut 5 on its threaded terminal 6 in order to hold the wheel 7 in position.

The wheel 7 embodies a hub 8 as usual which is disposed in line with the projecting axle end to receive the same and the outer end portion 9 of which is externally threaded and has the cap 10 fitted thereon.

The circumferential flange 11 of the hub 8 is disposed at the inner side of the wheel; and is provided with an annular, concentric rib 11' on its inner face, on which an annular washer 14 immediately fits and is supported, said washer being immediately encircled, in its turn, by an annular projection 13' which extends laterally outward or toward the wheel from a support 13 whereon it is formed. This support is substantially of angle section, and it includes a continuous in-turned portion $13^3$ and an outwardly-extending portion $13^2$, between which and the hub flange 11 is secured the central portion of the brake drum 12; said drum having its inner edge fitting immediately around and supported by projection 13'. The portion $13^3$ extends across the adjacent edges of the outer and inner race members 15 and 16 and thus serves to close access to the space between them; the outer member 15 being disposed interiorly of and contacting with said support 13 and being separated from the hub flange 11 by the washer 14, while the inner member 16 encircles and is supported on the reduced outer portion 17 of the bushing 2. A case is thereby formed for lubrication, to which access may be had in some suitable manner. If desired, and in order to avoid the entrance of foreign matter into the ball bearing support, a cover 20 may be fixed to the axle casing, as shown, said cover terminating adjacent the in-turned flange of the brake drum 12.

From the construction described, it will be obvious that the whole weight of the car is supported by the wheels, the load being transmitted from the axle casing to the bushing 2 and thence to the ball bearings, the axle 3 being quite free from such load and capable of freely transmitting motion to the wheels.

The wheel 7 may be put on or removed in one piece together with the ball bearing and its supports.

The invention may obviously be applied to the axles of motor cars of any of the above mentioned types.

I claim as my invention:

1. In combination, an axle; a tubular casing therefor; a tubular bushing secured in the end of the casing and projecting therebeyond but free of contact with the axle; a wheel having its hub disposed in line with the axle end to receive the same, said hub having a circumferential flange on its inner end provided on its inner face with an annular, concentric rib; an annular washer immediately fitting around and supported by said rib; an annular support of angle section having an annular projection which immediately fits around said washer; a brake drum having its inner edge fitting immediately around and supported by said projection and having its central portion interposed between the support and the hub flange; fastening bolts passing directly through the wheel, hub flange, central brake drum portion and support: an inner race member encircling and supported on the projecting end of the bushing; an outer race member arranged interiorly of and contacting with said support and separated from the hub flange by said washer, said support having a continuous in-turned portion which extends across and closes the space between the adjacent edges of the two race members so as to form a lubricant case which prevents access of foreign matter to said space while permitting access of lubricant thereto; and a series of anti-friction bearings disposed in said space.

2. In combination, an axle; a tubular casing therefor; a wheel having its hub disposed in line with the axle end to receive the same, said hub having a circumferential flange on its inner end provided on its inner side with an annular rib; an annular washer immediately fitting around and supported by said rib; an annular support of angle section located on the same side of the hub flange as said rib and formed with an annular projection which fits around said washer; a brake drum encircling said projection and immediately supported thereby, and having a portion which is interposed between the hub flange and the annular support; spaced outer and inner race members and an interposed series of anti-friction bearings arranged interiorly of said support; the latter embodying a circumferential wing which immediately encircles and supports the outer race member, and a continuous in-turned portion which extends across and closes the space between the two race members, so as to form a lubricant case which prevents access of foreign matter to said space while permitting access of lubricant thereto; and fastening bolts passing directly through the wheel, hub flange, brake drum and support, whereby some of the weight is removed from said bolts.

In testimony whereof I affix my signature.

LUIS CERRATO.